Figure 1:
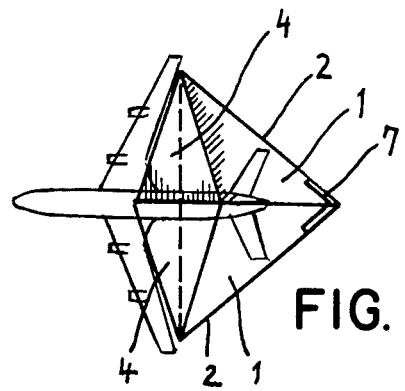

United States Patent [19]

Meyer-Bretschneider

[11] 4,169,517
[45] Oct. 2, 1979

[54] DEVICE SERVING THE NOISE CONTROL OF SOUND ENERGY RADIATED FROM THE JET ENGINES OF AN AIRCRAFT OPERATED ON THE GROUND IN STATIONARY POSITION

[76] Inventor: Thomas J. Meyer-Bretschneider, Holztwiete 8, D 2 Hamburg 52, Fed. Rep. of Germany

[21] Appl. No.: 762,306

[22] Filed: Jan. 25, 1977

Related U.S. Application Data

[63] Continuation-in-part of Ser. No. 550,683, Feb. 18, 1975, abandoned.

[30] Foreign Application Priority Data

Feb. 4, 1976 [DE] Fed. Rep. of Germany ....... 2604183

[51] Int. Cl.² ................................................. F01N 1/00
[52] U.S. Cl. .................................... 181/210; 181/218; 244/1 N
[58] Field of Search ................ 181/213, 217, 218, 68, 181/70, 210; 52/90; 244/1 N

[56] References Cited

U.S. PATENT DOCUMENTS

| | | | |
|---|---|---|---|
| 2,826,382 | 3/1958 | Hayden | 181/210 |
| 2,942,682 | 6/1960 | Bergh | 181/218 |
| 3,037,726 | 6/1962 | Phillips | 181/210 X |
| 3,096,847 | 7/1963 | Hardy | 181/210 |
| 3,230,673 | 1/1966 | Gersin | 52/90 |
| 3,349,868 | 10/1967 | Kurtze | 181/217 |
| 3,442,057 | 5/1969 | Derr | 52/90 |
| 3,550,333 | 12/1970 | Kliewer | 52/90 X |
| 3,630,313 | 12/1971 | Smith | 181/218 |

Primary Examiner—Nicholas P. Godici
Attorney, Agent, or Firm—Miller & Prestia

[57] ABSTRACT

A device for shielding the sound energy radiated from the jet engines of an aircraft formed from two panels being in horizontal and vertical longitudinal view arranged concavely in a clamshell type.

13 Claims, 7 Drawing Figures

DEVICE SERVING THE NOISE CONTROL OF SOUND ENERGY RADIATED FROM THE JET ENGINES OF AN AIRCRAFT OPERATED ON THE GROUND IN STATIONARY POSITION

This application is a continuation-in-part of application Ser. No. 550,683, filed Feb. 18, 1975, now abandoned.

The severe noise pollution caused by the operation of aircraft jet engines on the ground in stationary position disturbing neighboring residential areas demands the construction of facilities giving protection against such noise pollution. Closed halls, indeed, promise to give the greatest protection against such noise, however, with the size of modern commercial aircraft the construction of such halls is economically not realizable. So called "mufflers" have been in wide use consisting of bent ducts lined with a soundabsorbing material and the mufflers positioned at a certain distance behind each jet engine. Such mufflers can be used only in cases in which there is ample space behind the engines; that means normally only cases in which the engines are arranged at the tail of the aircraft. Furthermore they have the disadvantage that they are expensive to build and to operate since they must be designed and constructed to fit to each type of aircraft, thus making necessary an expensive keeping in store of a great variety of designs. This is true also for those types of mufflers which have a big inlet opening to enclose the whole tail of a certain aircraft with the engines provided at such tail. The simplest form of sound and noise control device known is an arrangement of simple walls erected around the aircraft. The walls are vertical or inclined backward to reflect the sound radiation in an upward direction and have a height slightly exceeding that of the jet engines to be noise-controlled. On account of the diffraction of the sound waves, the effect of such walls is limited, the more so as the walls have to be erected at a relatively great distance from the jet engines because of the considerable pressure exerted by the stream of jet gases on the walls. Furthermore, the effectivity is reduced by considerable distance from the engines if the walls are positioned such as to allow for different types of aircrafts. If they are to be positioned closer to the engines, only one type of aircraft can be received between them.

It is therefore an objective of the present invention to create a device serving the noise attenuation and control of sound energy radiated backward from the jet engines of an aircraft operated on the ground in a stationary position, such device having an especially favorable relationship of cost outlay to noise control effect. It is a further object of the invention to create a device which can be used for a variety of different types of aircrafts with good effect. Usually the airports are situated at the periphery of human settlements, so that it may be sufficient to control the sound radiation from the aircraft in one direction. It is, therefore, another object of the invention to create a device which is capable of controlling or shielding the sound radiation in an angular zone of at least about 180 degrees from the aircraft. According to the invention, these objects are achieved by a device for shielding the sound energy radiated from the jet engines of an aircraft operated on the ground in stationary position being formed essentially by two panels being in horizontal and vertical longitudinal view arranged concavely in a clamshell-manner, the panels being at (as measured in or near the basal plane) an angle between 60 and 120 degrees and being inclined towards the basal plane at an angle between 45 and 65 degrees, such as to define and to cover an essentially triangular space to receive a considerable part of the aircraft including or until close to the engines thereof.

The triangular form of the device is ideally suited to the form of an aircraft independently of form and size and irrespectively of whether it is positioned nose-in or nose-out. For every type of aircraft the most suitable arrangement can be chosen. For aircrafts radiating the sound energy mostly in a backward direction, a nose-out position may be preferred, whereas for aircrafts radiating most of the sound energy sideward or frontward the nose-in position may be better. Furthermore the best position may depend on what part of the aircraft the engines are arranged at. If they are arranged at the tail or at the tail and at the wings best effects are obtained in a nose-out position. If they are arranged at the wings, a nose-in position may give better results. It is a main advantage of the device according to the invention over known devices, that it can be used in very different ways for a great variety of types and sizes.

Even when aiming at an essentially better control of noises than has been achieved so far by use of vertical walls, it is not necessary to fully enclose the aircraft or its source of sound, respectively. It will be sufficient to effect such noise control at that side of the aircraft where high sound pressures originate.

The device usually is so erected that its open side shows away in a direction from the builtup areas to be protected, i.e., in direction of the airport's maneuvering area.

The present invention also permits the sound-absorbing surfaces to be positioned closer to the sources of sound than has been possible with traditional walls. The clamshell-shaped design of the device pursuant to the present invention means that the surfaces forming the device are inclined towards the opening side of the device. Thus, the weight of the surfaces, so to speak, presses forward; the momentum of jet engine gases exerted on the surfaces acts in opposite direction to their weight influence. The dimensioning can be easily so arranged that the momentum of gases does not or only slightly exceed the weight influence, the result of which is that the device pursuant to the present invention can be positioned very closely to the jet engines without necessitating the making of costly arrangements for the absorption of forces originating from the gas momentum.

In an especially advantageous design, the device consists essentially of two panels mounted inclined and at an angle symmetrical to the central axis of the device with the panels supporting each other. The panels' planes suitably cutting the basal plane at an angle between 120 and 60 degrees, preferably between 100 and 80 degrees. The panels' inclination in relation to the basal plane lies between 45 and 65 degrees, preferably between 30 and 50 degrees. This setup of the device from flat panels which can be premounted lying on the floor and subsequently erected by means of a crane is especially economical. In its simplest emobidment, the device consists of only two such triangular panels. In the event of a greater depth of the device being required without wanting to increase the width in relation to the two triangular panels, it is possible to extend forward the two panels arranged in an angular position to each other by another two flat panels, the planes of which cut the basal plane at an angle of less than 30 degrees and preferably arranged in parallel position to each other. Statically, it poses no difficulties (especially in respect of the momentum exerted by the jet engine gases) to design the front opening of the device with a forward inclination, if so required.

It is, indeed, possible to discharge the jet engine gases through the front opening of the device after corresponding alteration of the gas stream in the device; it is, however, of greater advantage to provide a discharge opening in the rearward, lower area of the device. In this case the gases are slightly diverted downwards by the sides of the device until reaching said discharge opening without unnecessary forces being released through a greater alteration in the stream of gases which forces would have to be absorbed by the structural design; in addition, a better ventilation of the device is achieved. It is advantageous to dimension the opening such that it can accommodate the nose of an aircraft in a nose-in position. Owing to this feature some types of aircrafts may enter the device deeper.

Though only a—section of an aircraft is enclosed by the device, a sound absorption is achieved which with regard to dwelling areas to be protected is almost equivalent to that of a fully enclosing hall, although costs and space requirements are only a small fractional amount of those costs incurred in connection with an all-enclosing hall. In comparison with simple shielding walls the noise control effect is essentially better, i.e., at a cost outlay which in relation to the effect achieved is essentially more favorable. As regards the use of "mufflers" here too the present invention brings a decrease in costs and an improvement in noise control.

Figure 3:
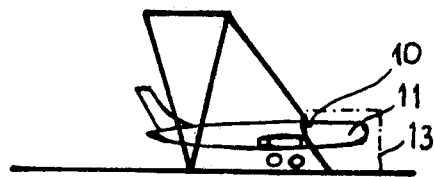
Figure 2:
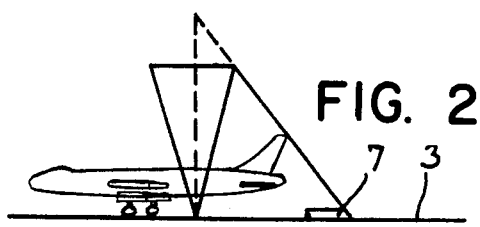
Figure 4:
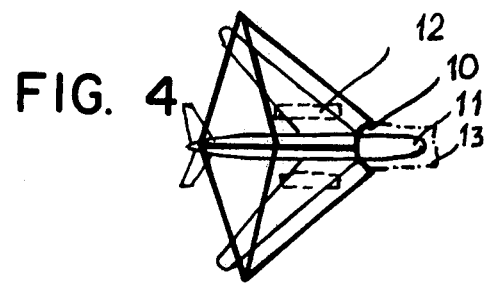
Figure 5:
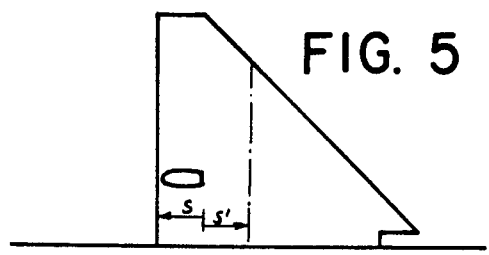
Figure 6:
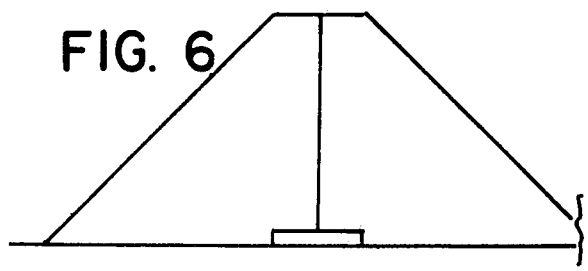
Figure 7:
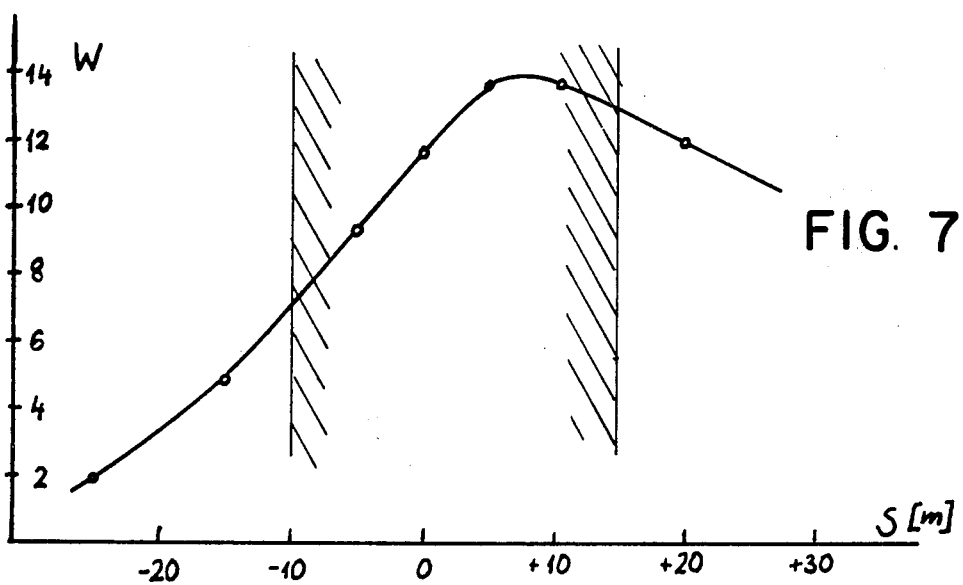

In the following, the present invention is explained in greater detail with reference to the drawing attached hereto which illustrates an advantageous embodiment of the device as per the present invention. The drawings illustrate:

FIGS. 1 and 2 a diagrammatic top view and side view of a first design of the device;

FIGS. 3 and 4 a top view and side view of a second design of the device;

FIGS. 5 and 6 a side view and front view of a third, extremely simple design of the device, and FIG. 7 a diagrammatic graph of cost out-lay for a device pursuant to FIGS. 5 and 6 hereof, in relation to sound energy absorbed with different depths of the device.

Pursuant to FIG. 1 the device is contructed of two triangular panels 1 essentially arranged in an identical and symmetrical position in relation to the central axis of the device. The panels' lines 2 of intersection with the basal plane 3 include an angle of approx. 80°. In its simplest design, the device consists only of these plane panels 1 when, for example, terminating at the front end in the manner as indicated by the dotted line. In the event it is intended to extend the device forward, as, for example, can be desirable in the case of aircraft with jet engines installed in a relatively forward position, another two triangular panels 4 can be connected to panels 1 so that a cantilevering roof with a horizontal roof ridge is obtained.

In the devices illustrated, an opening 7 is provided in the rear bottom section through which opening the gases can be discharged. Another noise-controlling wall can be installed on the outside wall of this discharge opening (not illustrated) to attenuate any such sound emanating from such opening, if necessary.

The embodiments according to FIGS. 3 and 4 are identical with that of FIGS. 1 and 2 except for the form of the opening 10 which in contrast to the opening 7 is large enough to receive the nose 11 of an aircraft. The opening 10 may be provided with additional devices for closing the opening around the nose if not used. Also it may be provided with shielding walls or a casing 13 as indicated in chain lines. However, normally such additional devices are not neccesary. From the drawing it becomes clear that in certain cases the sound sources (engines 12) can be brought closer to the sound absorbing surface of the planes 1 in a nose-in position.

In all design examples, the device is constructed of flat panels which on account of such flatness are relatively low-priced. The panels can be premounted lying on the floor, if necessary, and subsequently erected. In FIGS. 1 and 3 the inclination direction of the panels is indicated by the shading lines which follow the lines of steepest gradient. The device, or course, could also be constructed from non-flat component parts; for example, it could be rounded at the rear. A rounded transition from the rear flat panels to the front flat panels could also be provided. However, in such cases it is advisable that the area where the jet stream hits the device, the surface has an inclination forward to at least partially balance by the wall's weight the momentum exerted on the wall surface. In addition, by such inclination it shall be achieved that the alteration of the jet stream caused by the wall surface is only slight to keep in this way the momentum at a minimum.

On the basis of the devices illustrated in FIGS. 5 and 6 a cost computation was made comparing the costs of a device pursuant to the present invention with the costs of a conventional shielding wall. The basis of assumption in such computation was the noise control of a jet engine installed in the tail section of an aircraft at a height of 10 m, as is the case, for example, with a DC 10. According to methods practiced so far for the shielding of such jet engine, a 14 m high wall is required positioned at a distance of 70 m behind the jet engines. A closer positioning of the wall which would result in a higher degree of noise control is economically not realizable because of the jet stream momentum. As regards the present invention a device was assumed having a base width (horizontal dimension in FIG. 6) of 70 m and the triangular panels intersecting the basal plane over a length of 53 m (not taking into consideration the discharge opening at the rear). The panels are inclined at an angle of 58 degrees in relation to the basal plane. The panels are truncated at a height of 23 m.

It is assumed that the jet engine to be noisecontrolled is positioned at a height of 10 m inside or in front of this device, respectively, at a distance of 35 m from the rear end of the device (without taking into consideration the discharge opening), as is illustrated in FIG. 5.

For this device the noise-controlled portion X of the total sound energy produced by the jet engine was set in a proportionate relation to the costs of the device. The computation was made for various depths of the device, the depth of the device being expressed as the distance s of the front end of the device measured from the exhaust port of the jet engines. The value s has been entered in FIG. 5 with a continuous line for the test case illustrated. The front end lies in front of the jet engine; in this case s is assumed as positive. In the case illustrated in FIG.5 and indicated by a line-dot line the front end of the device lies behind the jet engine at the distance s'; here a negative value results for s'.

The so computed proportion x/k of the noise-controlled portion to the costs of the device pursuant to the present invention was related to the proportion x0/k0 of the noise-controlled portion and the costs of the shielding wall above described in greater detail. The resulting total proportional value W was entered in FIG. 7 over the distance s.

Evaluation of the graph shows that the value W at first steeply rises with increasing depth of the device until the front end of the device exceeds the jet engine (s30). The maximum is reached when the device passes a few meters beyond the jet engine, and then a decrease is recorded.

The present invention is based on the recognition of data obtained from such best economy curve, whereby the dimensions of the device advisably are kept within the hatched area of FIG. 7 depending on the degree of noise control required. Such area can be defined, for example, by the ratio of the depth to the width of the device, that lies especially between 0.5 and 0.8, preferably between 0.6 and 0.7. The greatest extension of the device forward of the jet engine usually should not be more than 70%, preferably 30%, of the depth of the device lying behind the jet engine with a specific aircraft serving the computation of the maximal dimension of the device. With normal commercial aircraft, the front end should not lie more than 20 m and preferably not more than 10 m before the jet engine exhaust ports of such aircraft which serves to compute the maximal dimension of the device.

The front end of the device can also lie behind the jet engine, as is illustrated in the graph of FIG. 7. Even with a 15 m distance of the jet engine from the front end of the device an economical effieiency is achieved which is five times the efficiency of the noise control wall used hitherto. However, it is advisable to arrange the front end of the device not more than 10 m behind the jet engines of the aircraft serving the computation of the maximal dimension of the device.

I claim:

1. In a sound attenuating housing for enclosing at least a portion of an aircraft having an engine operated on the ground in a stationary position so as to provide a shield for attenuating noise and controlling sound energy radiating from said aircraft, the combination comprising at least two inclined shielding wall members forming a housing having a large opening for permitting entry of said aircraft, said wall members inclined toward one another and leaning against each other so as to provide a shield for attenuating noise and controlling sound energy from said aircraft, at least a portion of the weight of said shielding wall members tending to press said shielding wall members toward one another, and means forming an opening arranged in said housing for discharging gases from said aircraft, whereby said aircraft engine may be oriented with respect to said opening to transmit engine exhaust gases therethrough, and wherein at least a portion of the force of said exhaust gases is exerted upon said inclined shielding wall members in opposition to said weight, said shielding wall members for an intersection which is angularly inclined upwardly from said opening for discharging exhaust gases to said larger opening.

2. The sound attenuating housing of claim 1 including means forming an opening opposite said large opening for receiving the front portion of said aircraft.

3. The sound attenuating housing of claim 1 wherein each of said wall members is inclined toward each other at an angle between 45 and 65 degrees.

4. The sound attenuating housing of claim 1 wherein said shielding wall members are generally triangular.

5. The sound attenuating housing of claim 1 wherein said shielding wall members are arranged concavely in a clam shell-type of form.

6. The sound attenuating housing of claim 1 wherein each shielding member is inclined toward each other at an angle between 45 and 65 degrees.

7. In a sound attenuating housing for enclosing at least a portion of an aircraft having an engine operated on the ground in a stationary position so as to provide a shield for attenuating noise and controlling sound energy radiating from said aircraft, said wall members being inclined toward one another and leaning against each other so as to provide a shield for attenuating noise and controlling sound energy from said aircraft, at least a portion of the weight of said shielding wall members tending to press said shielding wall members toward one another, two triangular panels connected to each one of said shielding wall members so as to form a cantilevering roof with an essentially horizontal roof ridge, and means forming an opening arranged in said housing for discharging gases from said aircraft, whereby said aircraft engine may be oriented with respect to said opening to transmit engine exhaust gases therethrough, and wherein at least a portion of the force of said exhaust gases is exerted upon said inclined shielding wall members in opposition to said weight.

8. The sound attenuating housing of claim 7 including means forming a larger opening for permitting entry of said aircraft into said housing.

9. The sound attenuating housing of claim 8 wherein said shielding wall members form an intersection which is angularly inclined upwardly from said opening for discharging exhaust gases to said larger opening.

10. The sound attenuating housing of claim 7 wherein said shielding wall members are generally triangular.

11. The sound attenuating housing of claim 7 wherein said shielding wall members are arranged concavely in a clam shell-type of form.

12. The sound attenuating housing of claim 7 wherein each shielding member is inclined toward each other at an angle between 45 and 65 degrees.

13. The sound attenuating housing of claim 7 including means forming an opening opposite said large opening for receiving the front portion of said aircraft.

* * * * *